(12) United States Patent
Irick et al.

(10) Patent No.: US 8,081,816 B1
(45) Date of Patent: Dec. 20, 2011

(54) APPARATUS AND METHOD FOR HARDWARE IMPLEMENTATION OF OBJECT RECOGNITION FROM AN IMAGE STREAM USING ARTIFICIAL NEURAL NETWORK

(76) Inventors: Kevin Maurice Irick, State College, PA (US); Vijaykrishnan Narayanan, State College, PA (US); Hankyu Moon, State College, PA (US); Rajeev Sharma, State College, PA (US); Namsoon Jung, State College, PA (US)

( * ) Notice: Subject to any disclaimer, the term of this patent is extended or adjusted under 35 U.S.C. 154(b) by 844 days.

(21) Appl. No.: 12/157,087

(22) Filed: Jun. 6, 2008

(51) Int. Cl.
*G06K 9/62* (2006.01)
(52) U.S. Cl. .......................................... 382/156; 706/15
(58) Field of Classification Search .................. 382/155, 382/156, 157, 158; 706/15, 27, 33
See application file for complete search history.

(56) References Cited

U.S. PATENT DOCUMENTS

| | | | |
|---|---|---|---|
| 5,253,330 A | 10/1993 | Remacher et al. | |
| 5,533,169 A * | 7/1996 | Burnod et al. | 706/41 |
| 5,799,134 A | 8/1998 | Chiueh et al. | |
| 5,956,703 A | 9/1999 | Turner et al. | |
| 6,324,532 B1 * | 11/2001 | Spence et al. | 706/27 |
| 6,836,767 B2 | 12/2004 | McBride | |
| 7,099,510 B2 * | 8/2006 | Jones et al. | 382/225 |
| 7,840,037 B2 * | 11/2010 | Lu et al. | 382/118 |

OTHER PUBLICATIONS

Irick et al. A unified streaming architecture for real time face detection and gender classification, 2007, IEEE.*
Irick et al. A real time embedded face dectector on FPGA, Signals, Systems and Computers, 2006, pp. 917-920.*
T. Theocharides, G. Link, N. Vijaykrishnan, M. J. Irwin, and V. Srikantam, "A Generic Reconfigurable Neural Network Architecture Implemented as a Network on Chip," in the Proceedings of the IEEE System on Chip Conference (SoCC, formerly ASIC), 2004.

* cited by examiner

*Primary Examiner* — John Strege

(57) ABSTRACT

The present invention is an apparatus and method for object recognition from at least an image stream from at least an image frame utilizing at least an artificial neural network. The present invention further comprises means for generating multiple components of an image pyramid simultaneously from a single image stream, means for providing the active pixel and interlayer neuron data to at least a subwindow processor, means for multiplying and accumulating the product of a pixel data or interlayer data and a synapse weight, and means for performing the activation of an accumulation. The present invention allows the artificial neural networks to be reconfigurable, thus embracing a broad range of object recognition applications in a flexible way. The subwindow processor in the present invention also further comprises means for performing neuron computations for at least a neuron. An exemplary embodiment of the present invention is used for object recognition, including face detection and gender recognition, in hardware. The apparatus comprises a digital circuitry system or IC that embodies the components of the present invention.

26 Claims, 17 Drawing Sheets

| 220 | 221 | 222 | 223 |
|---|---|---|---|
| TARGET NEURON IDENTIFIER 0 | WEIGHT | BIAS | END OF LIST |
| TARGET NEURON IDENTIFIER 1 | WEIGHT | BIAS | END OF LIST |
| TARGET NEURON IDENTIFIER 2 | WEIGHT | BIAS | END OF LIST |
| TARGET NEURON IDENTIFIER 0 | WEIGHT | BIAS | END OF LIST |
| TARGET NEURON IDENTIFIER 1 | WEIGHT | BIAS | END OF LIST |
| TARGET NEURON IDENTIFIER 2 | WEIGHT | BIAS | END OF LIST |
| TARGET NEURON IDENTIFIER 3 | WEIGHT | BIAS | END OF LIST |
| TARGET NEURON IDENTIFIER 4 | WEIGHT | BIAS | END OF LIST |
| TARGET NEURON IDENTIFIER 0 | WEIGHT | BIAS | END OF LIST |
| TARGET NEURON IDENTIFIER 1 | WEIGHT | BIAS | END OF LIST |

Fig. 12

APPARATUS AND METHOD FOR HARDWARE IMPLEMENTATION OF OBJECT RECOGNITION FROM AN IMAGE STREAM USING ARTIFICIAL NEURAL NETWORK

BACKGROUND OF THE INVENTION

1. Field of the Invention

The present invention is an apparatus and method for object recognition from at least an image stream from at least an image frame utilizing an artificial neural network, in which the invention further comprises means for simultaneously generating multiple subwindows of an image frame from a single image stream, means for providing pixel data and interlayer neuron data to at least a subwindow processor, means for multiplying and accumulating the product of pixel data or interlayer data and synapse weight, and means for applying an activation function to an accumulated neuron value, including the processes of utilizing the above means to produce the object recognition.

2. Background of the Invention

Several types of digital artificial neural network (ANN) architectures have been disclosed that allow programmability and reconfigurability of synapse connections, synapse weights, and neuron operation. As many of these architectures are not specific to object recognition they do not consider the intricacies of processing an image at a subwindow granularity. A "subwindow" is an N×M matrix of pixels that covers a rectangular area of an image frame which encompasses the input data that can be provided to an ANN.

T. Theocharides, G. Link, N. Vijaykrishnan, M. J. Irwin, V. Srikantam, "A Generic Reconfigurable Neural Network Architecture Implemented as a Network on Chip" (hereinafter Theocharides) proposes a Network-On-Chip architecture that links a cluster of four neuron processing elements and an activation unit to other such clusters. The disadvantage of this architecture, however, is that virtualization is only considered when mapping the neurons of a particular ANN onto a smaller number of processing elements while not considering the virtualization that can be achieved at the subwindow abstraction level. For example, in a raster scan image pixel stream that does not allow subwindows to overlap, the sequential arrival of pixels guarantees that the pixel will belong to only a single subwindow region. The single subwindow for which the current pixel in the pixel stream belongs is termed the "active subwindow" while all other subwindows are termed "inactive subwindows". The present invention comprises a method to reuse hardware resources belonging to inactive subwindows, allowing a reduction in overall hardware requirements.

Most of the prior art disclose ANN architectures for generically performing the neuron computation for a plurality of emulated neurons while not considering the input access patterns specific to streaming image sources. For example, U.S. Pat. No. 5,253,330, U.S. Pat. No. 5,799,134, and U.S. Pat. No. 6,836,767 disclose reconfigurable artificial neural network emulators for general purpose classification and detection tasks. Since the arrival pattern of input data is not assumed to be specific to raster image sources and processing is not constrained to subwindows, the architecture is not efficient for processing raster scan image streams. In contrast, the current invention includes the image pyramid generation process, which extracts the set of image subwindows from a streaming raster pixel stream.

U.S. Pat. No. 5,956,703 discloses an IC that performs the ANN computation for feed-forward and recurrent networks. The invention, however, requires complex synchronization of the processing element outputs to ensure that the computation is performed in a lockstep fashion and not corrupted otherwise. In contrast, the present invention uses a packet data format to transport data between layers of the ANN. The packet is comprised of data and identifying information that allows ANN computation to be performed in an asynchronous fashion without the risk of computation corruption.

Several processing elements dedicated to performing the neuron computation on a large number of neurons while utilizing a small number of hardware resources have been disclosed. For example, Theocharides discloses virtualization techniques that map many neurons to a fixed number of hardware resources including multipliers, adders, accumulators, and activation units. However, the number of neurons that can be emulated in these architectures is still limited by the amount of primary storage allotted to each processing element. The present invention comprises a mechanism that utilizes a virtualization scheme that swaps subwindows between primary and secondary storage to provide almost unlimited subwindow capacity for a given processing element.

SUMMARY

The present invention is a novel hardware architecture for reconfigurable artificial neural network specifically effective and efficient for processing streaming image frames consisting of a plurality of smaller subwindows. The present invention comprises a digital circuitry system or IC that embodies the components of the present invention. A "subwindow" is an N×M matrix of pixels that covers a rectangular area of an image frame. The position of a subwindow is defined by its upper-left vertex. The size of the pattern in the image that is covered by the subwindow is defined by the subwindow scale factor. Specifically, the scale factor describes to what degree an image region must be contract or expanded to fit into the fixed size subwindow. An image frame therefore consists of a plurality of subwindows each having a unique position in the image and corresponding to a region in the image that has been scaled.

Processing the image frame requires feeding each subwindow to an artificial neural network and measuring the output. The architecture includes at least one subwindow filter module which extracts subwindows of interest from an image for a fixed scale factor and origin as the pixels of the image stream from the input source. Subwindows can be declared as interesting or non-interesting at real-time as a result of information gained from an optional subwindow filtering process. Consequently, non-interesting subwindows can be discarded to reduce overall processing requirements. Furthermore, an embodiment in which all subwindows of interest can be extracted and processed in a single pass of the input stream will benefit from not requiring image buffering.

In addition to delimiting an image region, a subwindow logically encompasses the neurons, synapse connections, and synapse weights belonging to an instance of an artificial neural network. As such a subwindow is bound to an instance of a particular ANN configuration. The state of all neurons belonging to an instance of artificial neural network is maintained independently with each subwindow. As such, the resources required to simultaneously maintain state for all subwindows of an image frame can be prohibitive for many resource constrained application technologies.

The architecture includes a plurality of subwindow processing elements having computational elements that perform the artificial neural network computation on subwindows that are forwarded to them by the subwindow filter module. Pixel data are transported from subwindow filter modules to subwindow processing elements via an interconnection network. The subwindow processor multiplies neuron values with associated synapse weights and accumulates the product. Final accumulations are forwarded to neurons in the next layer identified by entries in a programmable table. The structure of the ANN is therefore configurable by programming the table. Activation function evaluation is facilitated by lookup tables that may reside in the processing element or are accessible by a global memory interface.

DRAWINGS—FIGURES

FIG. 12 shows exemplary target neuron table contents.

DETAILED DESCRIPTION OF THE INVENTION

Figure 1:
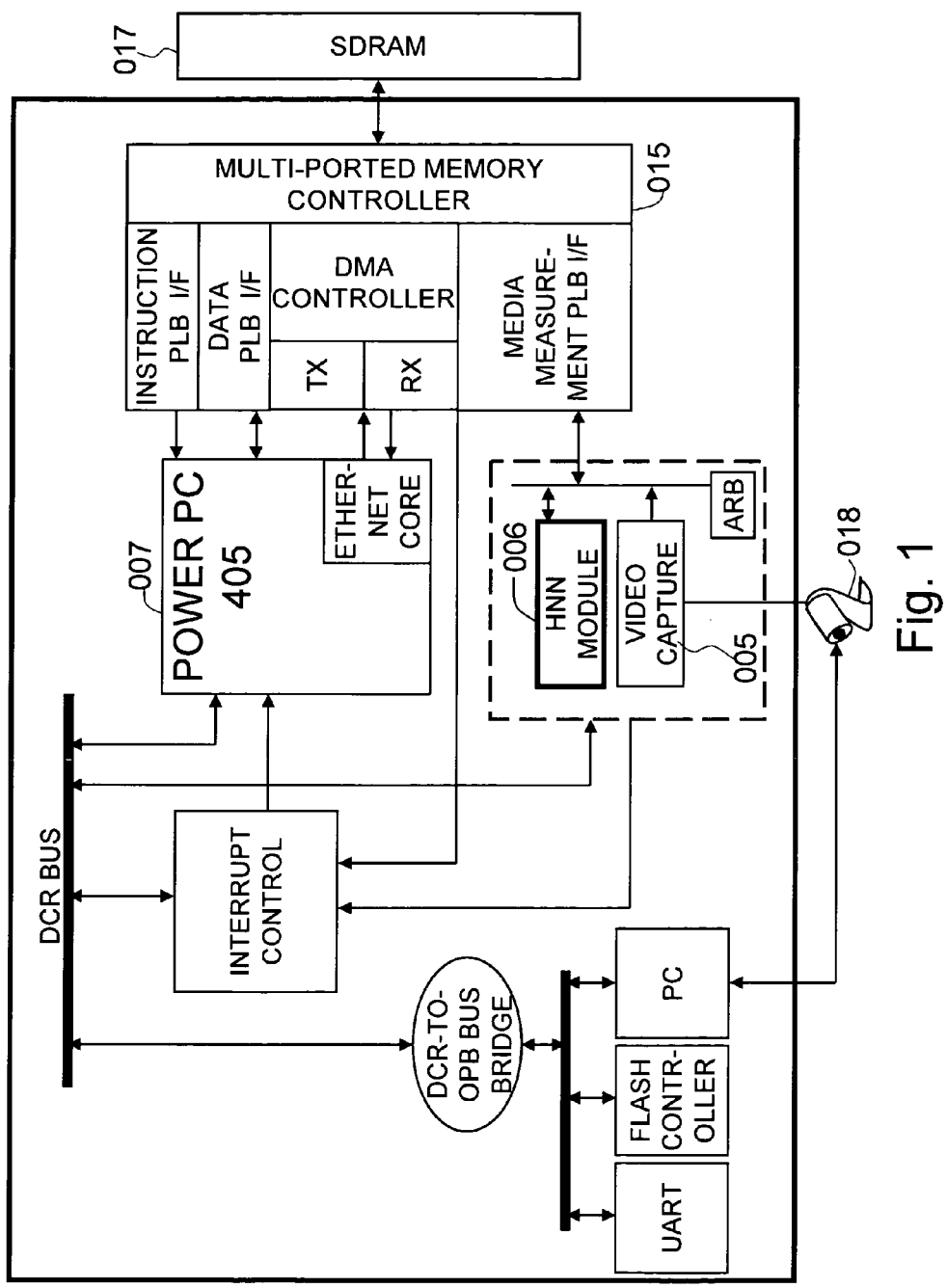
FIG. 1 shows an exemplary application of a preferred embodiment of the present invention.

FIG. 1 shows an exemplary application of a preferred embodiment of the present invention.

In this exemplary application, the preferred embodiment of the present invention is named as HNN module 006, and the HNN module 006 is used for face and gender detection on a Field Programmable Gate Array (FPGA). The present invention comprises a digital circuitry system or IC that embodies the components of the present invention.

A smart camera system that utilizes the current invention is shown in FIG. 1. A video source 018, acquires image frames which are subsequently stored in a shared memory 017. The HNN module 006 accesses video frames directly from the shared memory via a memory interface component 015. The results of processing an image frame are stored in the shared memory for subsequent retrieval and analysis by the embedded processor 007. In addition, all programmable aspects of the HNN module 006 are programmed by the embedded processor 007.

The present invention relates to reconfigurable artificial neural networks (ANNs), specifically those which are used in real-time object classification in image streams.

Many object classification applications utilize artificial neural networks as the underlying classification algorithm. Software ANN implementations offer flexibility in specifying those objects that can be classified at the expense of classification speed. Parallel hardware implementations offer high classification speed at the expense of flexibility in changing the specific classification task.

Figure 2:
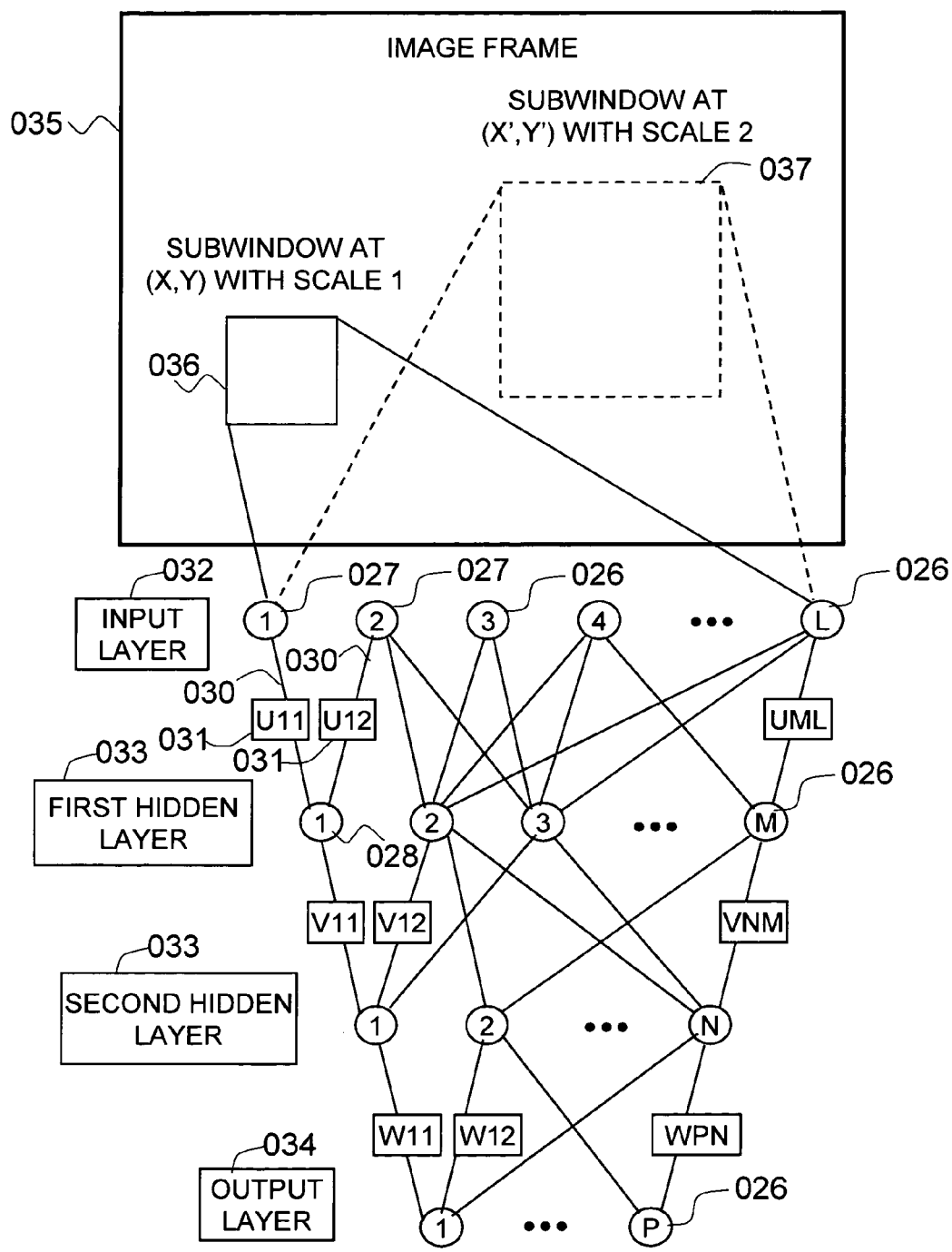
FIG. 2 shows a multi-layer neural network.

FIG. 2 shows a multi-layer neural network.

An artificial neural network consists of neurons and synapses that interconnect them. A synapse provides a unidirectional information pathway from a source neuron to a target neuron. The classification that the ANN performs is related to the function of each neuron, the connectivity of the neurons, and the efficiency of information transfer across connecting synapse of each source and target neuron pair. In ANN terminology, the efficiency of a synapse to transfer information is described by an associated attribute termed weight.

The operation of the ANN is as follows: A target neuron 028 receives inputs from its adjacent source neurons 027 via incoming synapses 030. Each input has been transformed by the weights 031 attribute associated with the synapses 030 that it traversed. The neuron aggregates the inputs into a single quantity. An output is generated as a function of the aggregate quantity and sent to all adjacent neurons via its outgoing synapses. The signals from the neurons 026 from the input layer 032 are processed by neurons 026 in hidden layers 033. The quantities evaluated at the neurons 026 in the output layer 034 typically determine the classification results.

In image classification applications, the inputs into the input layer 032 of neurons 026 come from the pixels that comprise the image frame 035. It is common that an artificial neural network is designed to perform classification on subwindows 036 and 037 that are significantly smaller than the image frame. For example, in a typical 320×240 pixel image frame, a particular ANN may be designed to classify rectangular 20×20 pixel subwindows. In this regard, the classifier is iteratively applied to each 20×20 region of interest in the frame to classify image regions at different positions in the image frame 035. In addition, to classify objects that vary in size requires applying the classifier to iteratively scaled versions of the image. The present invention comprises a method to process each subwindow as image pixels are streamed into the device in a particular scanning order.

The present invention is a novel hardware architecture for reconfigurable artificial neural networks specifically effective and efficient for processing streaming image frames consisting of a plurality of smaller subwindows. A subwindow is an N×M matrix of pixels that covers a rectangular area of an image frame. The position of a subwindow is defined by its upper-left vertex. The size of the pattern in the image that is covered by the subwindow is defined by the subwindow scale factor. Specifically, the scale factor describes to what degree an image region must be contract or expanded to fit into the fixed size subwindow. An image frame therefore consists of a plurality of subwindows, each having a unique position in the image and corresponding to a region in the image that has been scaled. The present invention can process multiple concurrent subwindows of different scale factors and locations within the original image. For instance, the ANN can simultaneously process subwindow 036 at (x, y) with scale 1 and subwindow 037 at (x', y') with scale 2.

Processing the image frame requires feeding each subwindow to an artificial neural network and measuring the output. The architecture includes at least one subwindow filter module that extracts subwindows of interest from an image for a fixed scale factor and origin as the pixels of the image stream from the input source. A subwindow can be declared as interesting or non-interesting at real-time as a result of information gained from an optional subwindow filtering process.

Consequently, non-interesting subwindows can be discarded to reduce overall processing requirements. Furthermore, an embodiment in which all subwindows of interest can be extracted and processed in a single pass of the input stream will benefit from not requiring image buffering.

In addition to delimiting an image region, a subwindow logically encompasses the neurons, synapse connections, and synapse weights belonging to an instance of an artificial neural network. As such, a subwindow is bound to an instance of a particular ANN configuration. The state of all neurons belonging to an instance of an artificial neural network is maintained independently with each subwindow. The resources required to maintain state for all subwindows of an image frame can be prohibitive for many resource-constrained application technologies.

Figure 3:
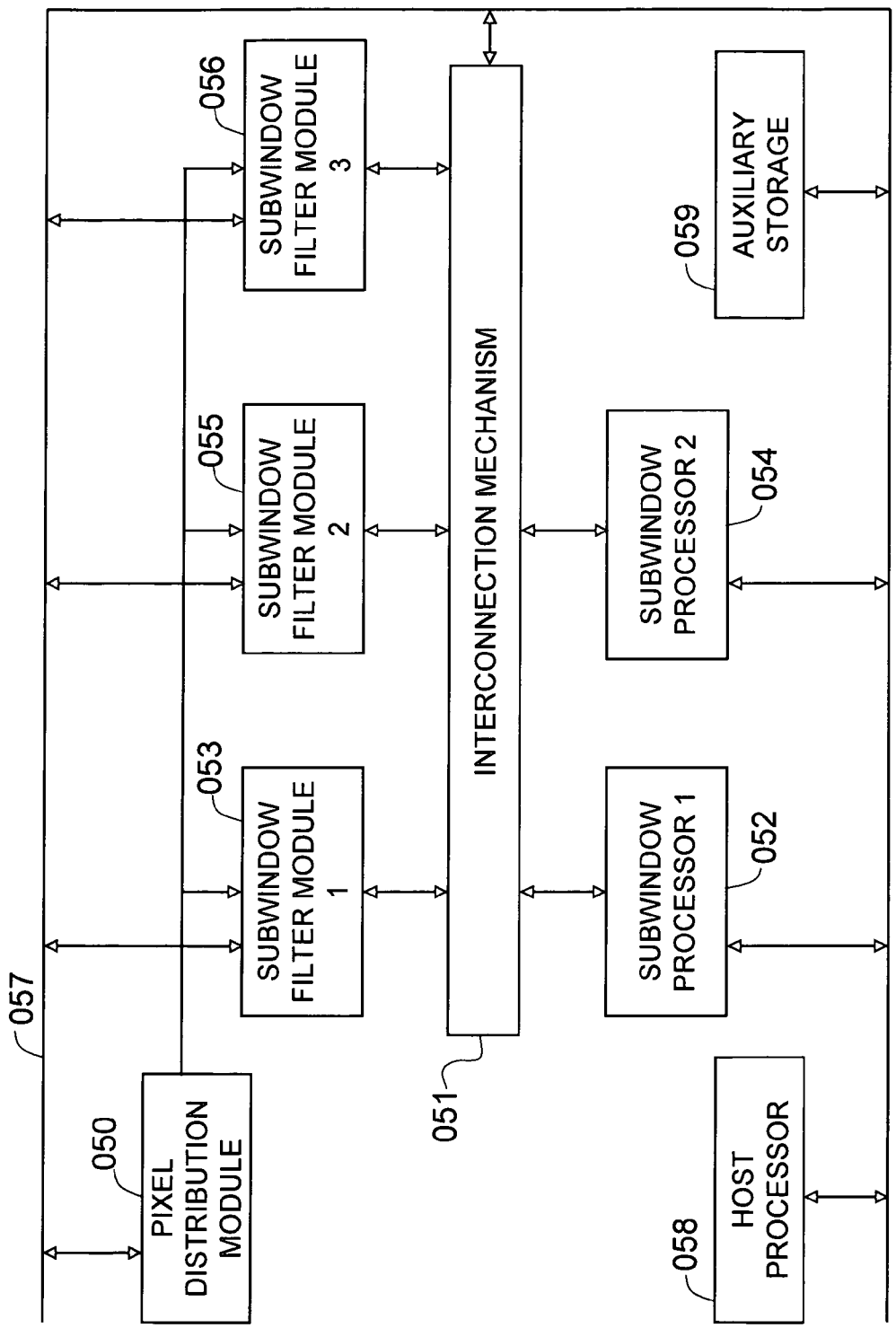
FIG. 3 shows exemplary components of an exemplary embodiment of the present invention.

FIG. 3 shows exemplary components of an exemplary embodiment of the present invention.

This exemplary embodiment of the present invention comprises at least a single pixel distribution module 050; a plurality of subwindow filter modules such as the "subwindow filter module 1" 053, "subwindow filter module 2" 055, and "subwindow filter module 3" 056; a plurality of subwindow processors such as the "subwindow processor 1" 052, and "subwindow processor 2" 054; at least a single auxiliary storage 059 device; at least a single host processor 058; and at least a single system bus 057. The pixel distribution module 050 scales the image frame by subsampling the incoming pixel stream and distributes a plurality of scaled pixel streams to the respective subwindow filter modules, i.e., three scaled pixel streams in this exemplary embodiment. The subwindow filter modules subsequently group the incoming pixels into a plurality of subwindows. The pixels that constitute a subwindow along with pixel identification information are routed through the interconnection network 051 to a subwindow processor that has been designated to process the subwindow. The subwindow processor performs the ANN calculation on the pixels that arrive from the interconnection network for the plurality of subwindows. The system bus 057 allows a host processor 058 to access and configure every programmable aspect of the present invention. Each programmable entity in the present invention is memory addressable and accessible via the system bus 058 utilizing a suitable bus protocol. The auxiliary storage device 059 provides high capacity storage for temporarily storing subwindow context such as "subwindow context 0" 200, "subwindow context 1" 201, and "subwindow context 2" 202.

Figure 4:
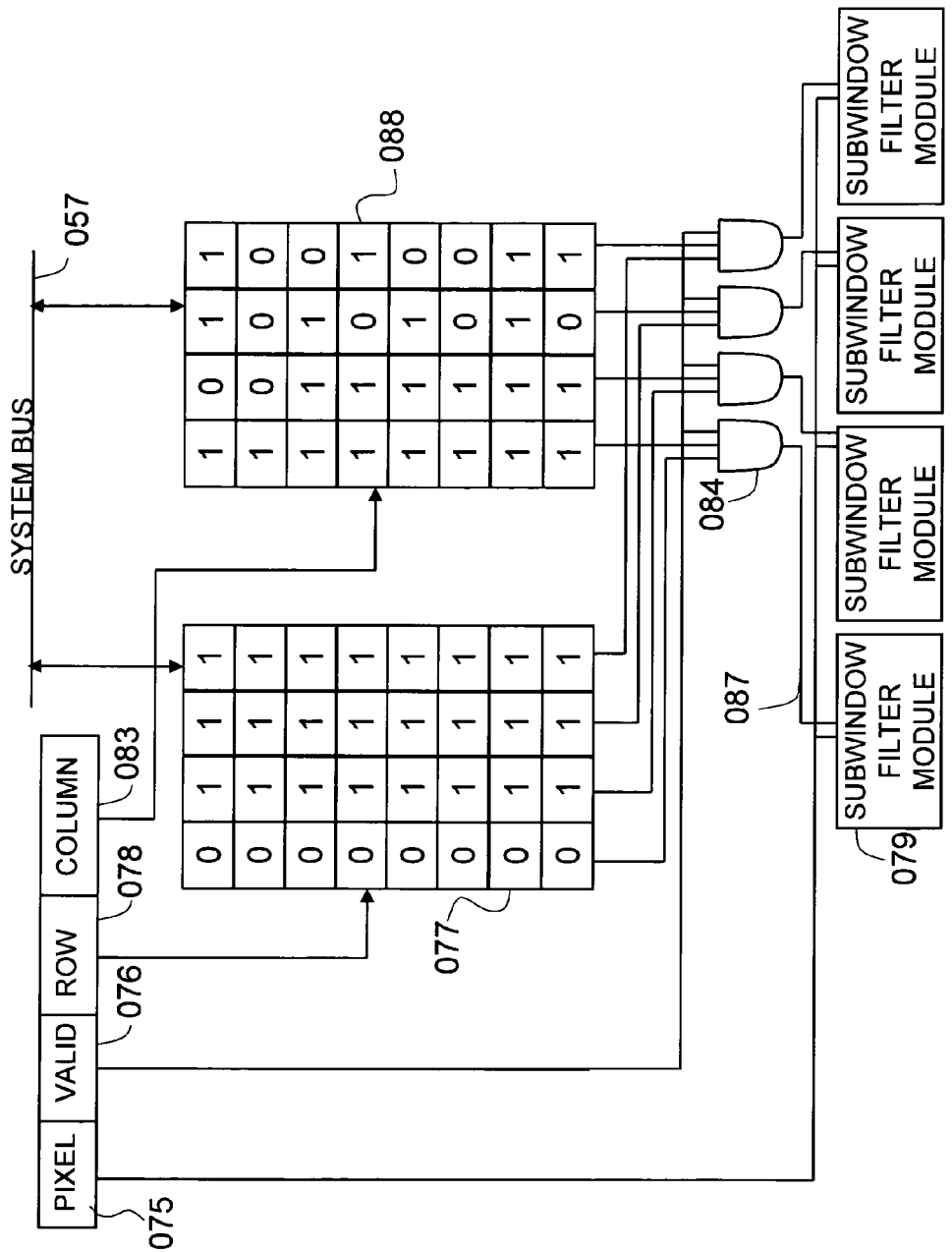
FIG. 4 shows an exemplary pixel distribution module.

FIG. 4 shows an exemplary pixel distribution module.

The first step in the process is pixel distribution. The objective of the pixel distribution module 050 (PDM) is to forward pixels from the input stream to the proper subwindow filter module (SFM) 079. Each subwindow filter module is dedicated to arranging the pixels from the pixel distribution module into subwindows that encompass the image frame 029 at a specific image scale factor and (x,y) offset from the upper-left corner of the image frame. The pixel distribution module scales the input stream at each of the scaling factors associated with each subwindow filter module and forwards the subsequent pixels to the respective subwindow filter module. FIG. 4 illustrates the preferred embodiment of a pixel distribution module in which scaling is performed using a subsampling scheme. The row scale table 077 contains entries that specify for each subwindow filter module which rows of the image frame are valid for the scale factor associated with the subwindow filter module. Specifically, the entry at row "i" and column "j" in the row scale table designates if subwindow filter module "j" should receive pixels from the "ith" row of the image frame. For example, the "1" located at the $1^{st}$ row and the $2^{nd}$ column in the row scale table designates that subwindow filter module 2 has an associated scale factor that at least requires pixels from the $1^{st}$ row of the image frame.

Similarly, the column scale table 088 contains entries that specify for each subwindow filter module which columns of the image frame are valid for the scale factor associated with the subwindow filter module. Specifically, the entry at row "I" and column "j" in the column scale table designates if subwindow filter module "j" should receive the "ith" pixel from any row of the image frame. For example, the "0" located at the $1^{st}$ row and the $2^{nd}$ column in the column scale table designates that subwindow filter module 2 has an associated scale factor that does not require the $2^{nd}$ pixel from any row of the image frame.

Data arrives into the pixel distribution module as a pixel 075 field, valid flag 076, row 078 field, and column 083 field. The row 078 field indexes the row scale table. The column 083 field indexes the column scale table. The bitwise logical AND, formed by AND gate 084, of the outputs of the row scale table and column scale table along with the valid field forms independent write enable 087 signals for each subwindow filter module. The system bus 057 allows the row scale table and column scale table to be dynamically programmed by the host processor 058 to specify the scale factor at which each subwindow filter module operates.

Figure 5:
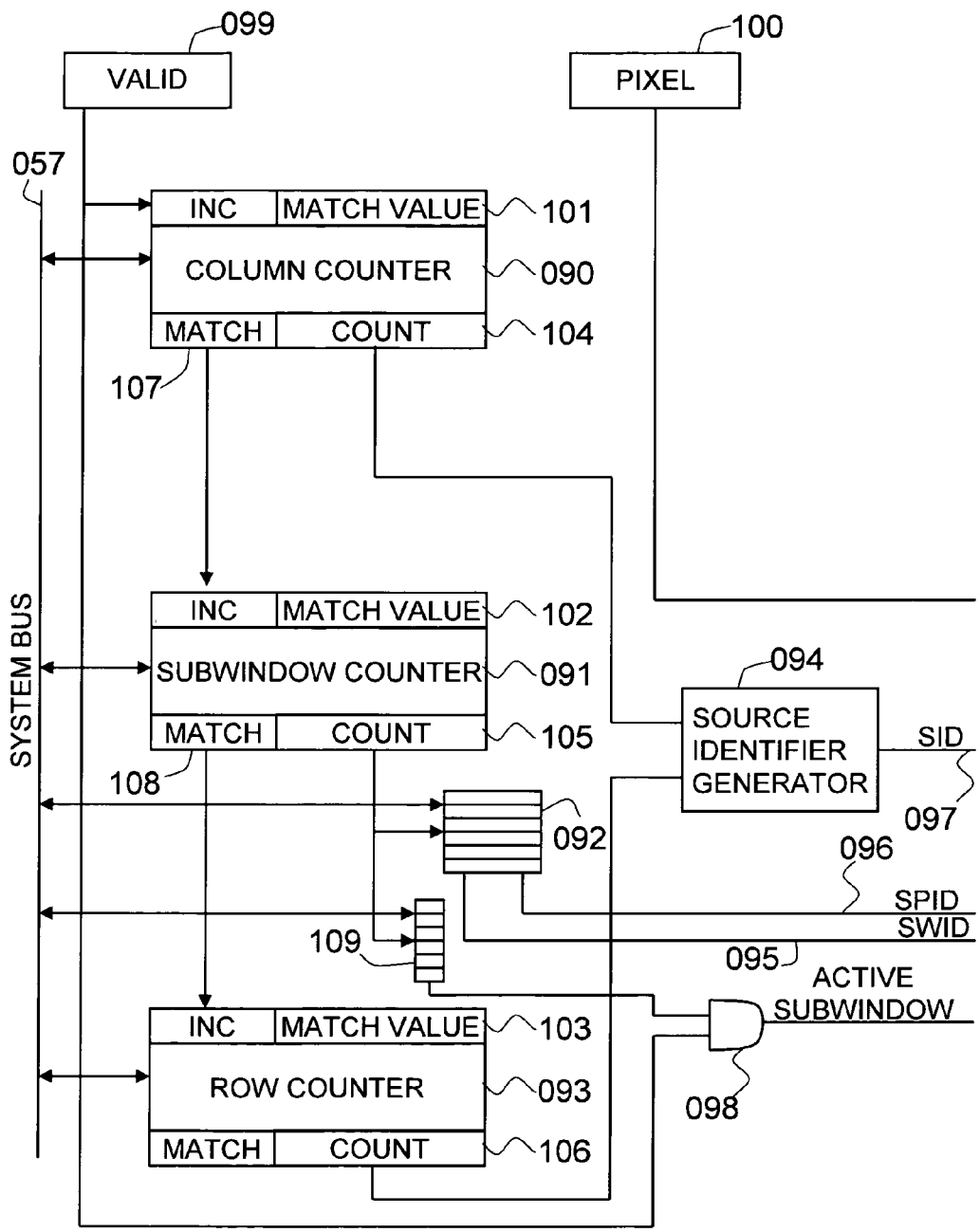
FIG. 5 shows an exemplary subwindow filtering module.

FIG. 5 shows an exemplary subwindow filter module.

The primary goal of the subwindow filter module is to group pixels that originate from the pixel distribution module into subwindows and to append an identifier, source identifier (SID) 097, to each pixel that uniquely identifies its geometric position in the subwindow. A secondary goal of the subwindow filter module is to discard pixels belonging to subwindows that have been designated as non-interesting. The final goal of the subwindow filter module is to forward pixels and associated SID to the subwindow processor that has been designated to perform the ANN calculation for the given subwindow. An external process designates the subwindow to subwindow processor mapping and provides a unique identifier, subwindow identifier (SID), which uniquely identifies a pixel's subwindow membership within a subwindow processor.

Data arrives into the subwindow filter module as a pixel 100 field and valid flag 099. The column counter 090, subwindow counter 091, and row counter 093 are programmable modulo-n counters that zero their counts when the count reaches a programmable match value: "column counter match value" 101, "subwindow counter match value" 102, and "row counter match value" 103, respectively. Each counter is programmed via the system bus 057. The column counter maintains a column count modulo the subwindow width. The column counter match value 101 is therefore programmed with the subwindow width. The subwindow counter maintains a count of the number of subwindows seen since the beginning of the current row modulo the maximum number of subwindows allowed for a row at the scale factor. The subwindow counter match value 102 is programmed with the maximum number of subwindows allowed in a row for the given scale factor. The row counter maintains a row count modulo the subwindow height. The row counter match value 103 is programmed with the subwindow height.

The valid flag 099 increments the column counter. When the column count reaches subwindow width, the column counter asserts a column counter match flag 107 for one cycle. The assertion of the column counter match flag signifies the completion of a subwindow row and subsequently causes the subwindow counter to increment. The subwindow count identifies the currently active subwindow as defined by its horizontal location in the pixel stream. When the subwindow count reaches its match value (maximum number of subwindows per row), the subwindow counter asserts a subwindow counter match flag 108 for one time period. The assertion of the subwindow counter match flag signifies the completion of a row and subsequently causes the row counter to increment.

The subwindow count indexes into the subwindow mapping table 092. The output of the subwindow mapping table is the subwindow processor identifier (SPID) 096 which specifies the subwindow processor to which the pixels belonging to the active subwindow should be forwarded. In addition, the output of the subwindow mapping table is the subwindow identifier (SWID) 095 which locally identifies the subwindow within the subwindow processor to which it is designated. Entries in the subwindow mapping table are programmed by the host processor 058 via the system bus 057.

The subwindow enable vector 109 is also indexed by the subwindow count. Each entry in the subwindow enable vector is a 1-bit field that specifies if the subwindow associated with the subwindow count is active or inactive. The subwindow enable vector 109 is dynamically programmable by the host processor 058 via the system bus 057 in a fashion that specifies which subwindows are of interest and that should be forwarded to a subwindow processor. The output of the subwindow enable vector 109 is applied to one input of AND gate 098. The valid 099 field is applied to the other input of AND gate 098. If the output of AND gate 098 is asserted, then the current pixel, SPID, SWID, and SID belong to an active subwindow (ie. a subwindow of interest). For each pixel belonging to an active subwindow, the subwindow filter module outputs a pixel packet. The pixel packet, illustrated in FIG. 6, consists of the SPID, Pixel, SWID, and SID.

Figure 6:
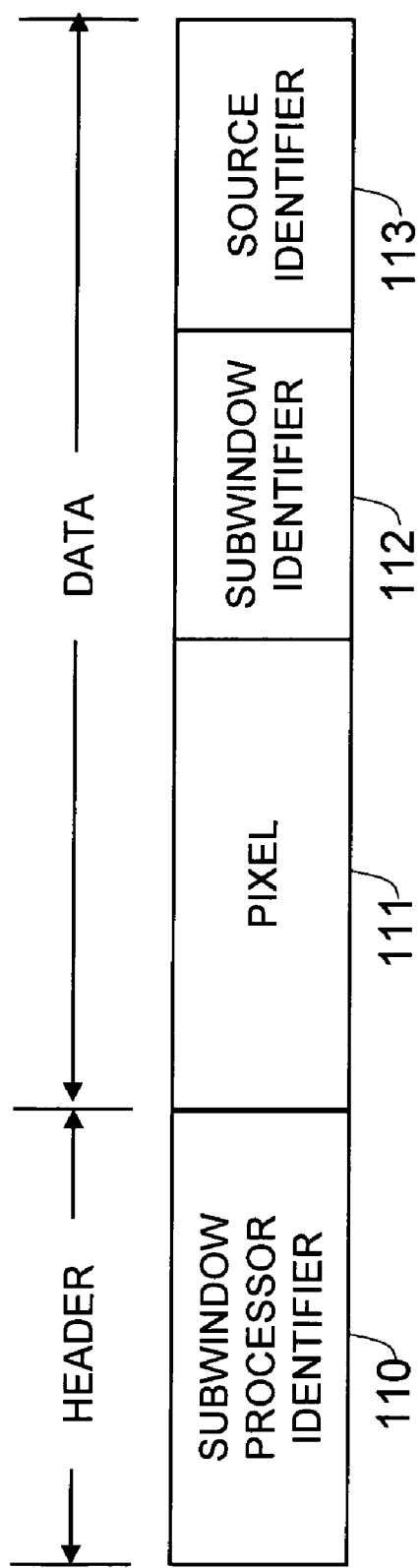
FIG. 6 shows an exemplary pixel data packet.

FIG. 6 shows an exemplary pixel data packet.

The pixel data packet (PDP) consists of a header portion and data portion. The header portion contains a subwindow processor identifier 110 (SPID) that uniquely specifies the subwindow processor to which the pixel data packet should be routed. The data portion contains a pixel 111 field that represents the value of a pixel; a subwindow identifier 122 field that uniquely identifies a subwindow context within the subwindow processor; and a source identifier 113 field that uniquely identifies a neuron in the artificial neural network. Pixel data packets transport data from a pixel source into the input layer 032.

Figure 7:
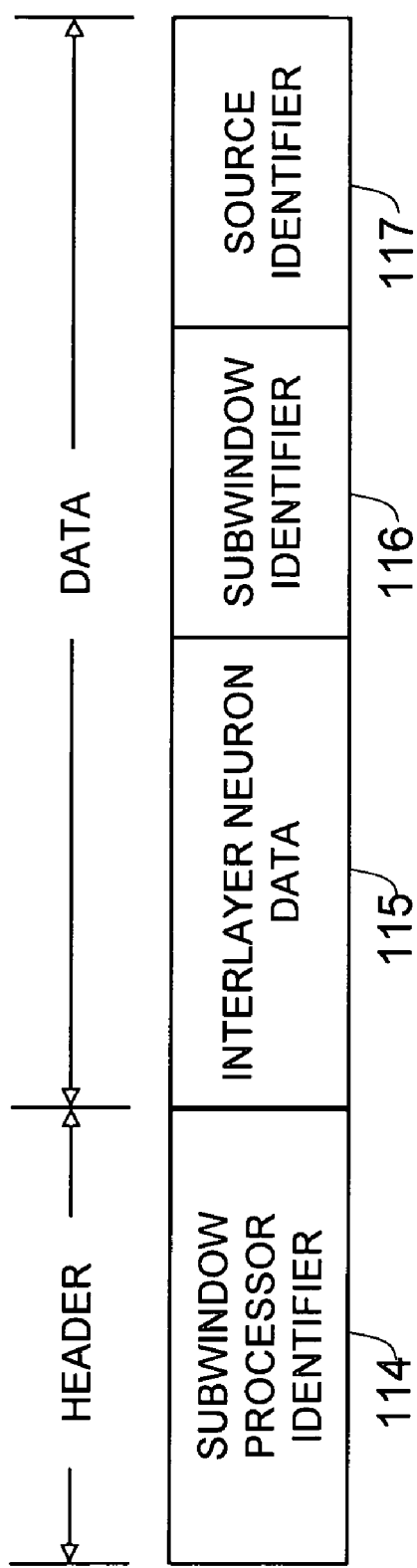
FIG. 7 shows an exemplary interlayer neuron data packet.

FIG. 7 shows an exemplary interlayer neuron data packet.

The interlayer neuron data packet (IDP) consists of a header portion and data portion. The header portion contains a subwindow processor identifier 114 (SPID) that uniquely specifies the subwindow processor to which the interlayer data packet should be routed. The data portion contains an interlayer neuron data 115 field that represents the value of a neuron output; a subwindow identifier 116 field that uniquely identifies a subwindow context within the subwindow processor; and a source identifier 117 field that uniquely identifies a neuron in the artificial neural network. Interlayer neuron data packets transport data within and across hidden layers 033 and to the output layer 034.

Pixels are subsequently forwarded to an array of subwindow processor elements dedicated to performing the neuron computations for a given set of subwindows in a time multiplexed fashion. Each subwindow processor element comprises a multiply-accumulate mechanism, accumulator storage, a synapse lookup table, and an activation function approximation mechanism.

Figure 8:
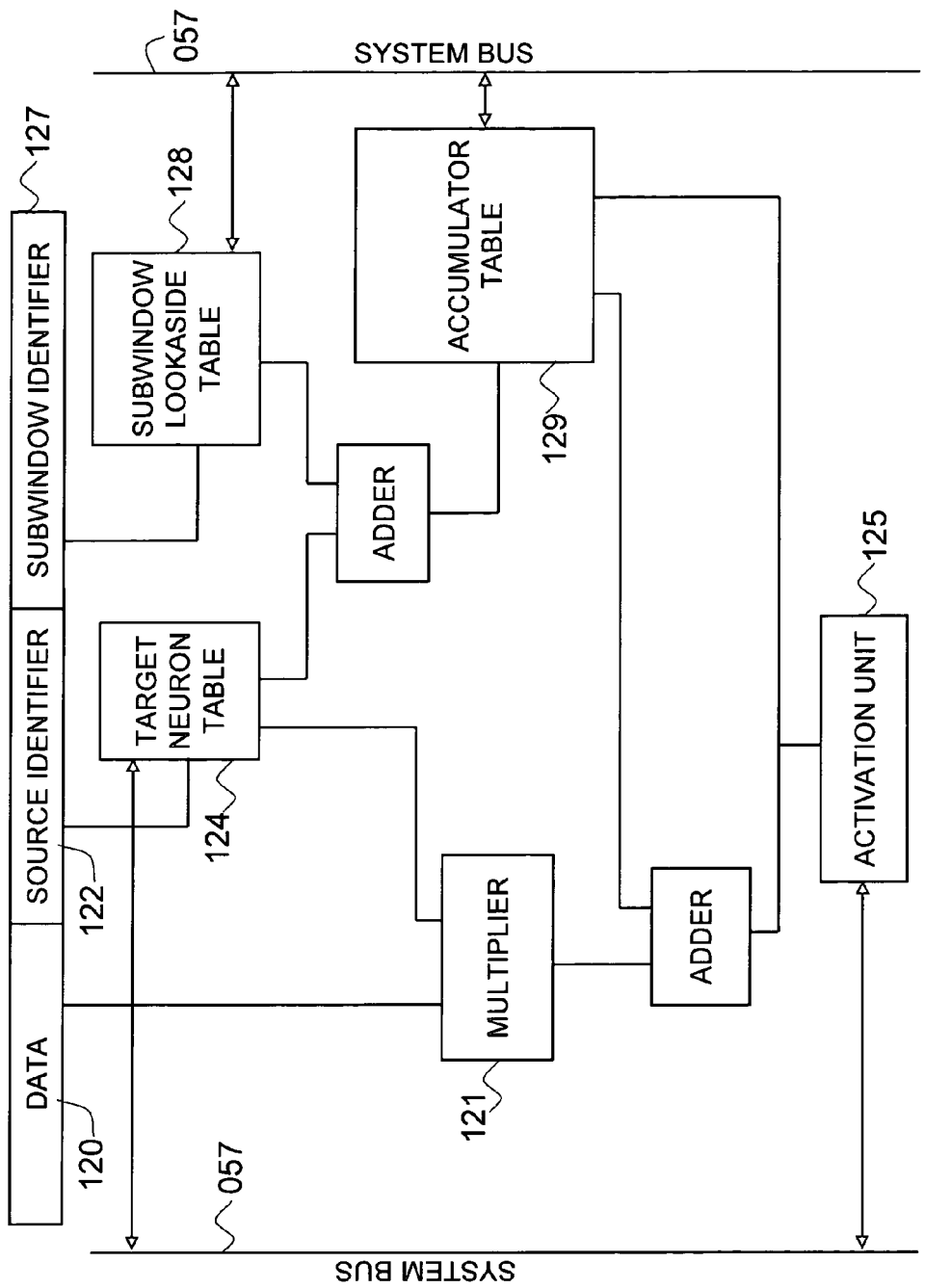
FIG. 8 shows an overview of an exemplary subwindow processor.

FIG. 8 illustrates the preferred embodiment of a subwindow processor.

The subwindow processor contains all resources needed to perform the ANN operation on a set of subwindows. All calculations for a given subwindow are performed by a single subwindow processor. The components of the subwindow processor include: multiplier 121, adder 122, accumulator table 129, target neuron table 124, subwindow lookaside table 128, and activation unit 125. Entries within the target neuron table 124, subwindow lookaside table 128, accumulator table 129, and activation unit 125 are programmable via the system bus 057.

Data arrives at the subwindow processor in the form of a pixel data packet (PDP), shown in FIG. 6, or an interlayer data packet (IDP), shown in FIG. 7. A PDP originates directly from the subwindow filter module, while an IDP originates from a subwindow processor. The incoming PDP or IDP contain pixel/interlayer neuron data 120 field subwindow identifier 127 field, and source identifier 122 field. The difference in the two packet types is the type of data that they transport: PDPs transport pixels into the input layer 032 of an ANN, while IDPs transport interlayer neuron data across hidden layers such as 033.

Figure 9A:
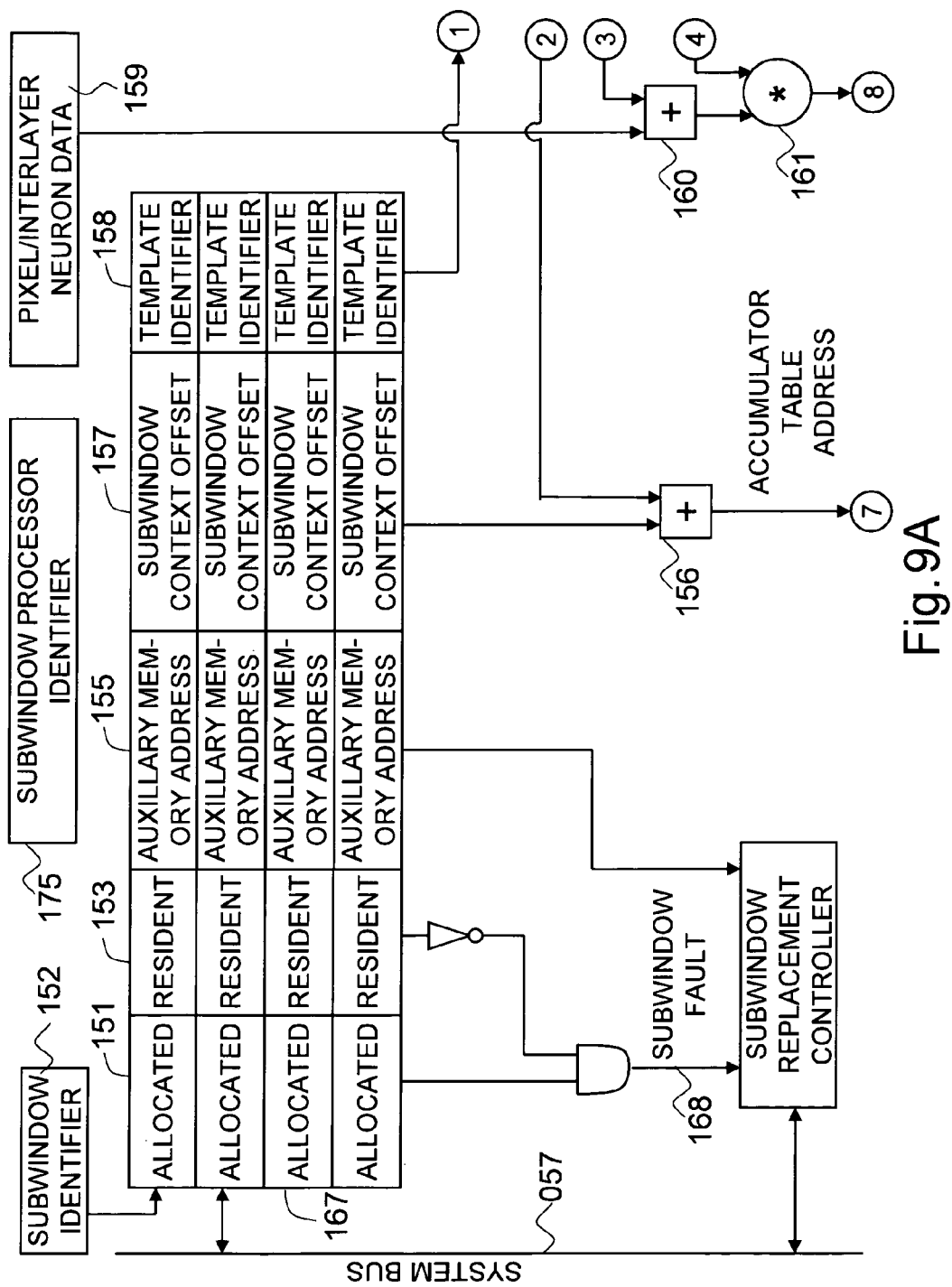
FIG. 9A shows an exemplary subwindow processor detailed view.
Figure 9B:
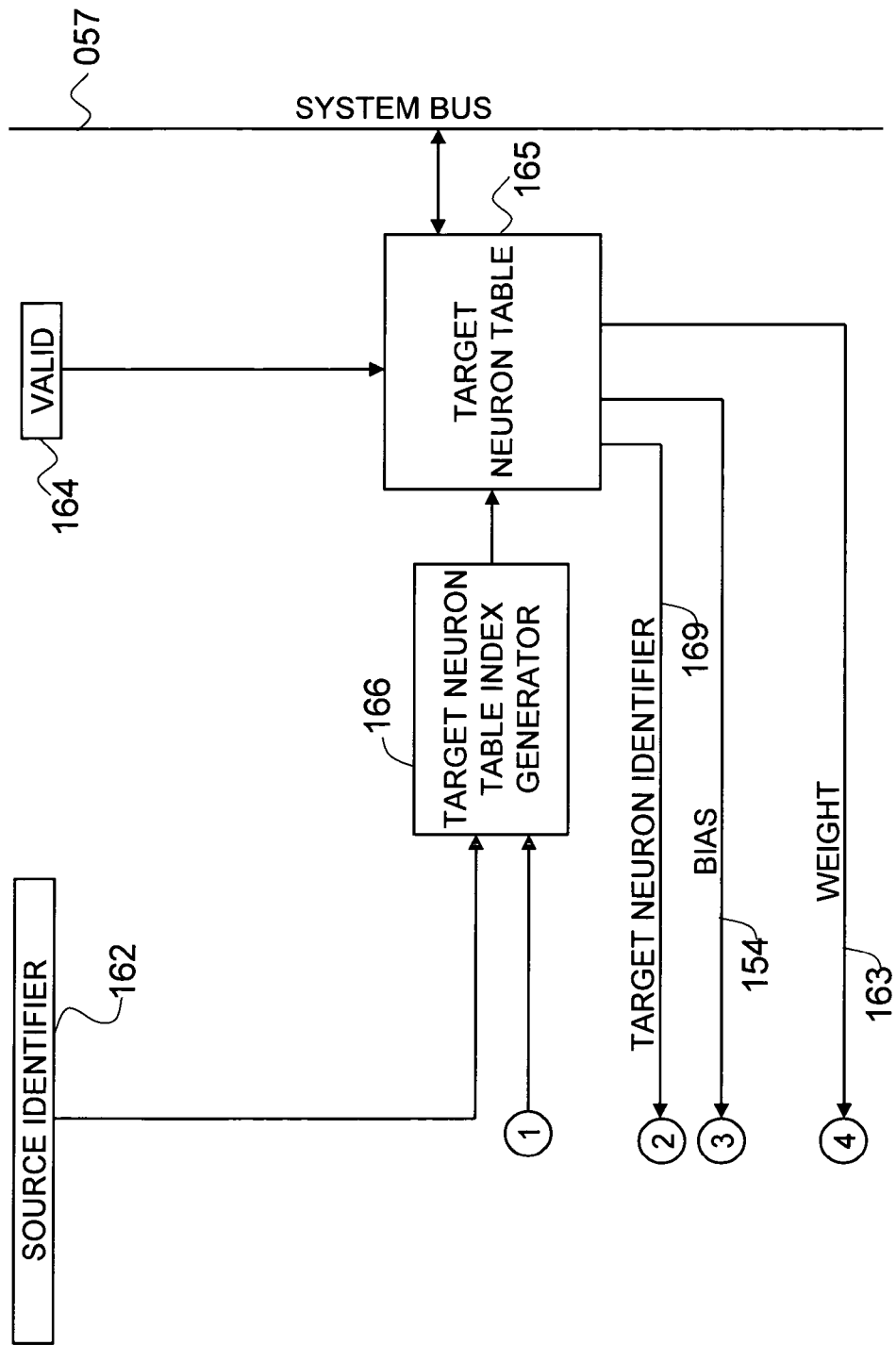
FIG. 9B shows an exemplary subwindow processor detailed view.
Figure 9C:
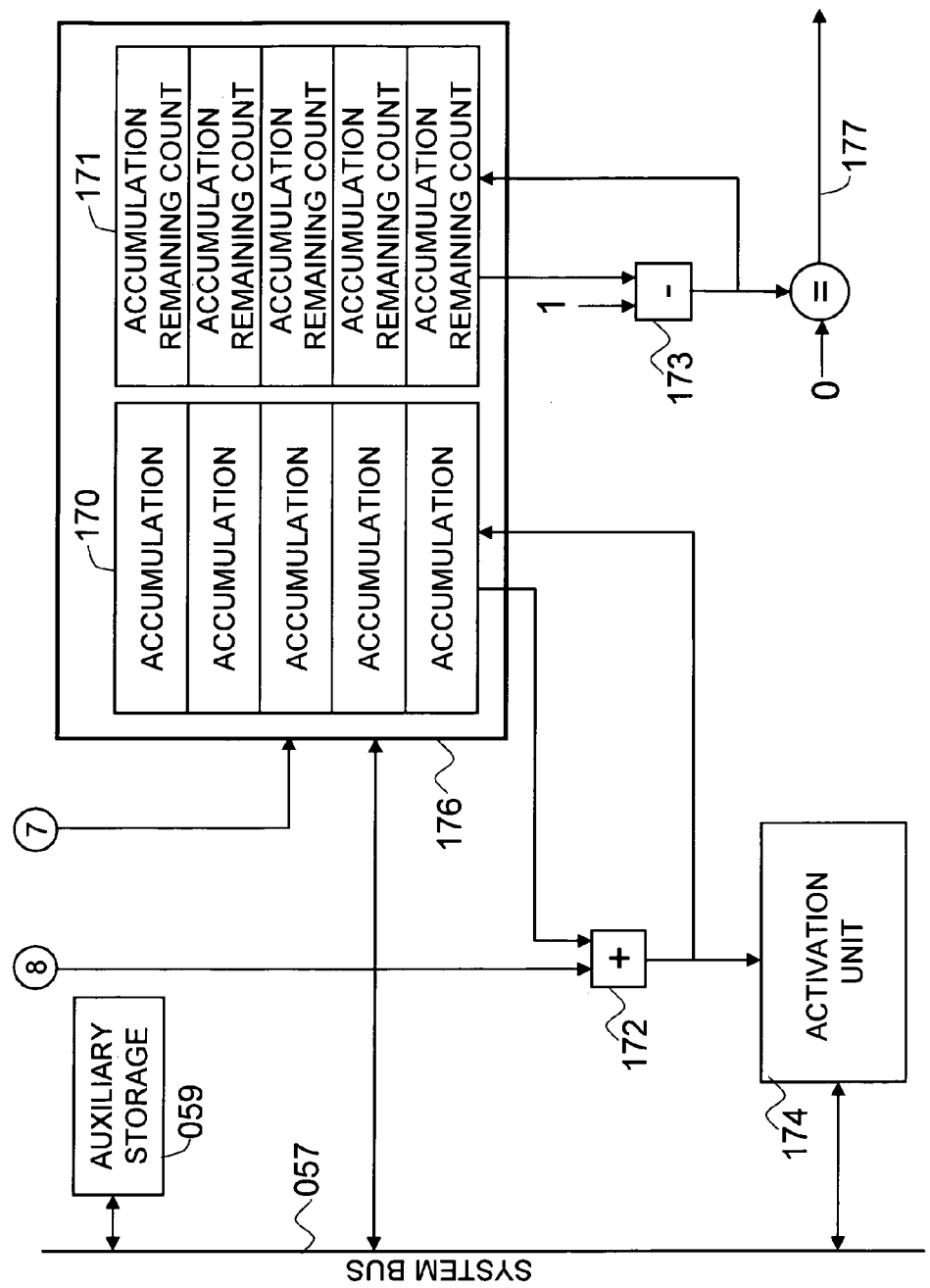
FIG. 9C shows an exemplary subwindow processor detailed view.
Figure 10:
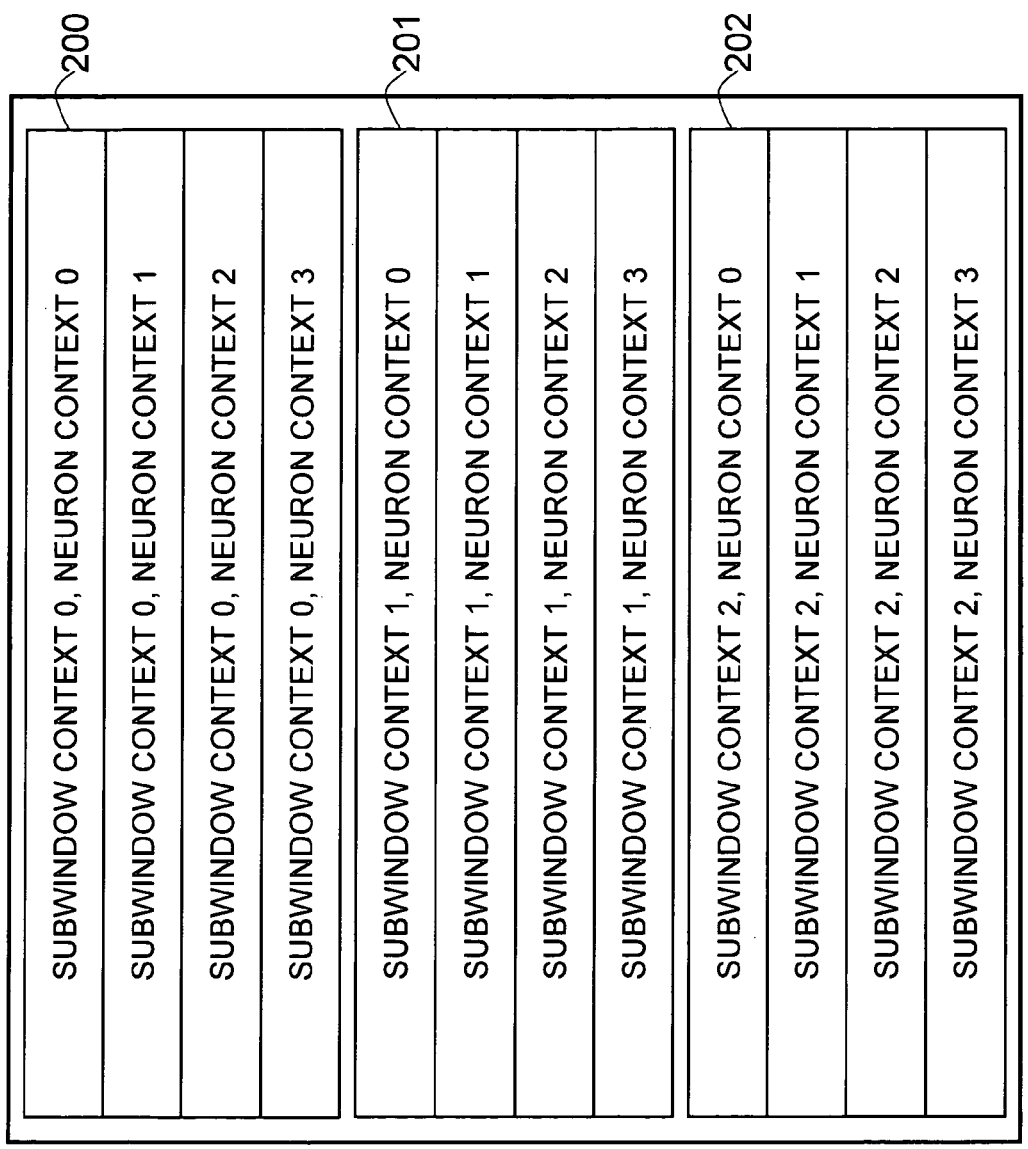
FIG. 10 shows exemplary accumulator table contents.

FIG. 9A, FIG. 9B, and FIG. 9C show a detailed view of an exemplary subwindow processor. FIG. 10 shows exemplary accumulator table contents.

The accumulator table 176 maintains the data and state of all in-progress computations associated with the subwindow processor. An entry in the accumulator table 176 contains the intermediate accumulation and status information for a single neuron, which is collectively termed neuron context. The collection of neuron context belonging to a single subwindow is called a subwindow context. FIG. 10 illustrates three subwindow context, "subwindow context 0" 200, "subwindow context 1" 201, and "subwindow context 2" 202, each consisting of four neuron context. A neuron context consists of an accumulation 170 field and an accumulation remaining count 171 field. The accumulation 170 field maintains the in-progress weighted summation. The accumulation remaining count 171 field maintains a count of the number of outstanding accumulations that must occur before the accumulation field can be forwarded to the activation unit. At the time the neuron context is initialized within the accumulator table, the accumulation remaining count field is programmed with a count equal to the number of incoming synapse connections associated with the neuron. The collection of all neuron contexts belonging to a single subwindow is termed a "subwindow context." The accumulator table stores as many subwindow contexts possible within the resource constraints of the implementation technology.

The primary goal of the subwindow lookaside table is to map a subwindow identifier SID to a subwindow context offset 157, which references the start of the subwindow context associated with the subwindow identifier within the accumulator table. The subwindow lookaside table is particularly necessary in embodiments that may relocate or swap subwindow contexts from the accumulator table 176 to auxiliary storage 059 to facilitate accumulator table virtualization such that a large number of subwindow contexts may be logically mapped to a single subwindow processor. Entries within the subwindow lookaside table are initially programmed by the host processor 058 via the system bus 057.

The subwindow lookaside table is indexed by the SID field of the active PDP or IDP. The allocated 151 field identifies if the subwindow context specified by the SID has been previously allocated to the subwindow processor. The resident 153 field identifies if the subwindow context specified by the SID is currently located in the accumulator table or if it has been located in auxiliary storage. If the subwindow context is located in auxiliary storage, the auxiliary memory address 155 field specifies the memory location at which the subwindow context is currently stored.

A single subwindow processor is capable of performing the ANN operation for a plurality of heterogeneous ANN configurations. An ANN configuration has an associated template that describes the neurons, synapse connections, and synapse weights. The template identifier 158 field identifies the configuration of the artificial neural network that is associated with the subwindow context.

The subwindow replacement controller is activated when the subwindow fault 168 signal is asserted, indicating that the subwindow context associated with the active SWID is not resident in the accumulator table. Activation of the subwindow replacement controller results in the invocation of the subwindow replacement process illustrated in FIG. 11. The goal of the subwindow replacement controller is to identify one or more replaceable subwindow contexts that are resident in the accumulator table 176 and move them from the accumulator table to auxiliary storage 059. Furthermore, the subwindow replacement controller transfers the subwindow context that causes the subwindow fault from auxiliary storage 059 to the vacancy created by the previous step.

Figure 11:
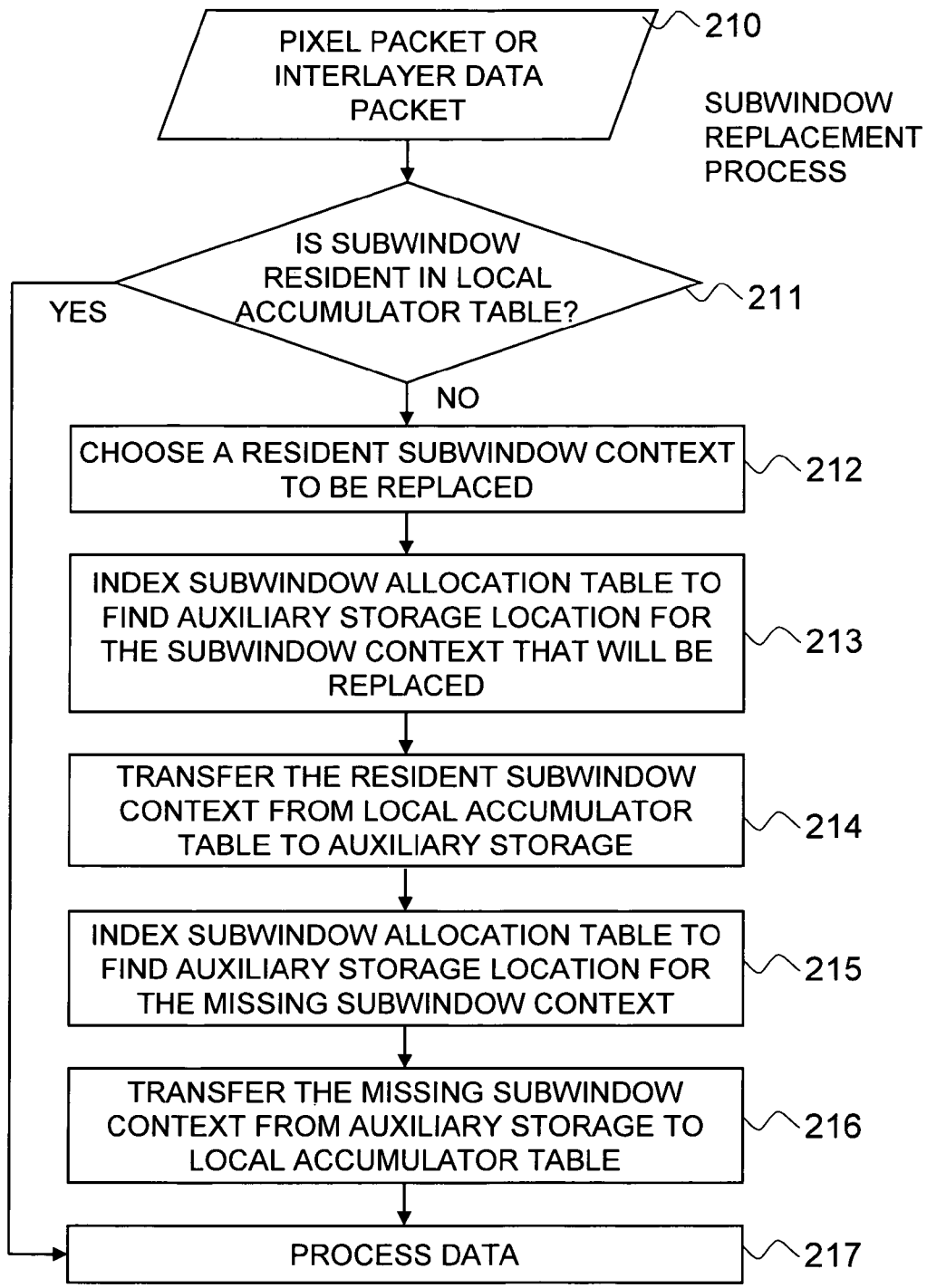
FIG. 11 shows an exemplary subwindow replacement process.

FIG. 11 shows an exemplary subwindow replacement process.

The subwindow replacement process (SRP) begins with the arrival of a PDP or an IDP 210. The subwindow identifier field indexes the subwindow lookaside table. In SRP step 2 211, the subwindow fault flag is evaluated. If the subwindow fault flag is not asserted, processing of the PDP or IDP continues as normal. If the subwindow fault flag is asserted, the process continues at SRP step 3 212. In step 3 212, a resident subwindow context is chosen to be evicted from the accumulator table to auxiliary storage. Any policy, such as least recently accessed, may be utilized to choose the subwindow context to be evicted. In SRP step 4 213, the auxiliary memory address 155 field associated with the evicted subwindow context is retrieved from the subwindow lookaside table. In SRP step 5 214, the subwindow context chosen to be evicted is transferred via the system bus 057 from the accumulator table 176 to auxiliary storage 059 starting at the memory location referenced by the auxiliary memory address. In SRP step 6 215, the auxiliary memory address 155 field associated with the missing subwindow context is retrieved from the subwindow lookaside table. In SRP step 7 216, the missing subwindow context is transferred via the system bus 057 from auxiliary memory 059 starting at the address referenced by the auxiliary memory address and is stored in the accumulator table 176 at the vacancy created by the evicted subwindow context. Also in SRP step 7 216, the resident flag 153 associated with the missing subwindow context is updated to reflect that the missing subwindow context is now resident in the accumulator table. Processing of the PDP or IDP continues as outlined.

Multiplier 121 generates the product of the incoming data 159 and the weight 163 field of the currently indexed synapse context. Adder 3 172 adds the product with the existing accumulation 170 field of the currently indexed neuron context. The output of adder 3 172 is the new partial sum of the neuron that will replace the old value stored in the accumulation 171 field of the currently indexed neuron context.

FIG. 12 shows exemplary target neuron table contents.

An entry within the target neuron table describes a synapse between a source neuron and target neuron, and is therefore termed a "synapse context." A synapse context describes the connection between a source neuron, which is specified collectively by the data portion of a PDP or an IDP, and a target neuron that is a recipient of the source neuron output. A synapse context consists of a target neuron identifier (TNID) 220, a weight 221, a bias 222, and an end-of-list flag 223. The TNID identifies the neuron that is a recipient of data traversing the synapse associated with the indexed synapse context. The weight field contains the weighting factor that affects the data traversing the synapse. Some embodiments may directly store the weighting factor in the weight field, while other embodiments may store a pointer to an auxiliary data structure that ultimately stores the weight. The latter embodiment will benefit those applications in which the weighting factors are highly redundant and storing each instance of a redundant weight would be regarded as wasteful. The bias 222 is a constant that is added to the data field before it is multiplied with the weight. The bias is useful in scenarios that require some form of normalization of the input pixel or interlayer neuron data. The end-of-list flag delineates the end of a contiguous list of synapse contexts belonging to a single source neuron. Each entry within the target neuron table is programmed by the host processor 058 via the system bus 057.

The target neuron table index generator generates indexes into the target neuron table that access each synapse context associated with a source neuron.

Figure 13:
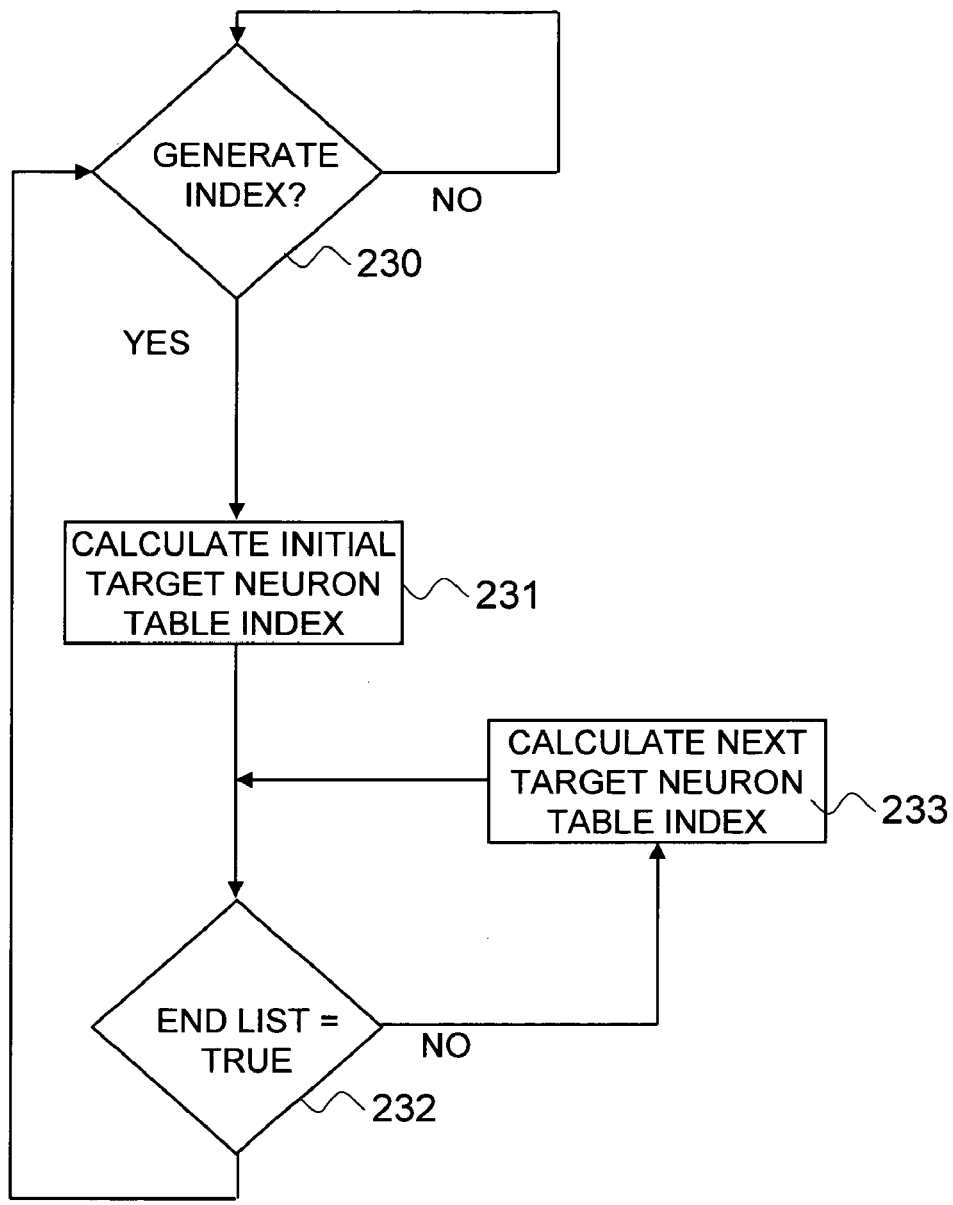
FIG. 13 shows an exemplary target neuron table list traversal process.

FIG. 13 shows an exemplary target neuron table list traversal process.

The target neuron table index generator (TNTIG) is provided with the source identifier 127 field of an active PDP or IDP and the template identifier retrieved from the subwindow lookaside table. In the TNTIG step 1 230, the availability of a PDP or an IDP is determined. If neither a PDP nor IDP is available, the process repeats at the TNTIG step 1. Otherwise, the process proceeds to the TNTIG step 2 231, in which the initial target neuron table index is calculated from the source identifier 162 field of the PDP or IDP and the template offset 158 field retrieved from the subwindow lookaside table. In the TNTIG step 3 232, the end-of-list flag 223 of the synapse context associated with the index calculated in the TNTIG step 2 is evaluated. If the end-of-list flag is set, the process repeats at the TNTIG step 1. If the end-of-list is not set, processing continues at the TNTIG step 4 233. In the TNTIG step 4, the next TNID is calculated as a function of the current TNID, after which processing continues from the TNTIG step 3 232.

Figure 14A:
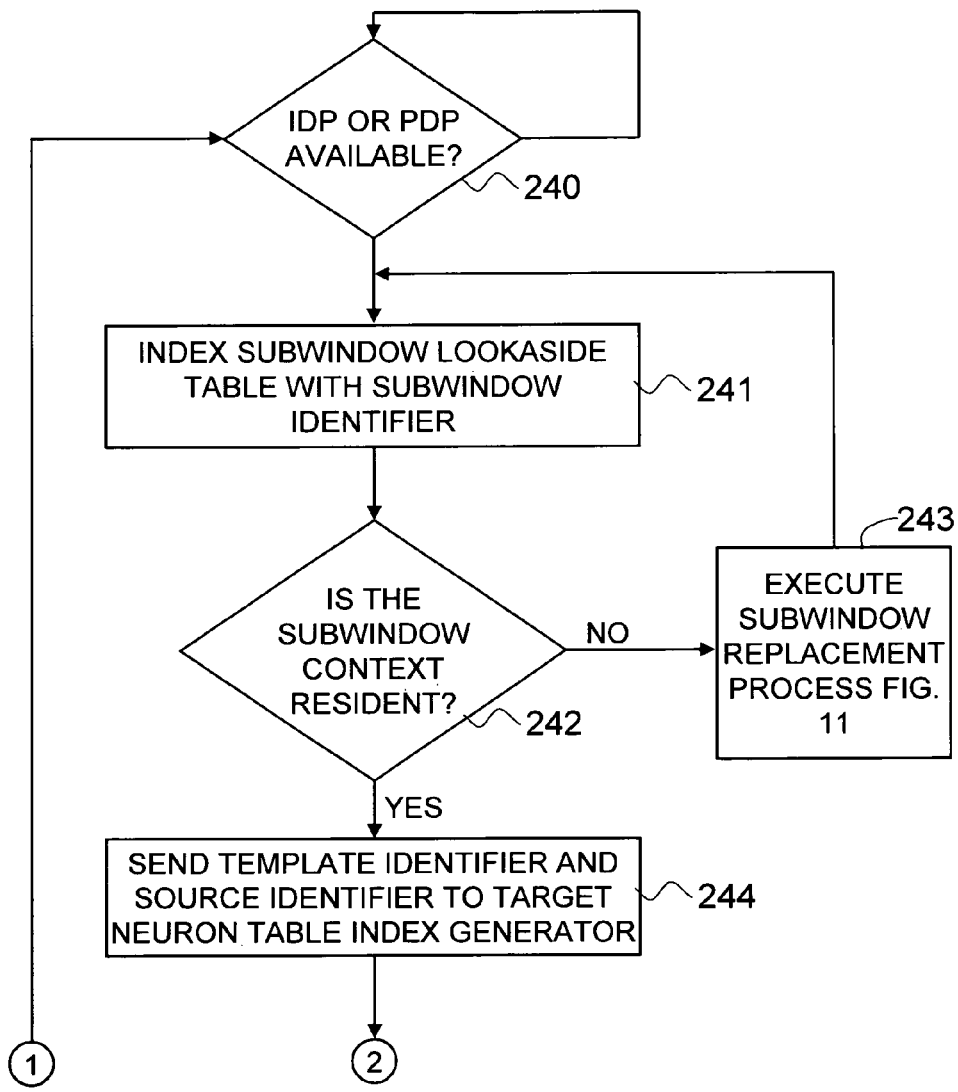
FIG. 14A shows an exemplary subwindow processor operation flowchart.
Figure 14B:
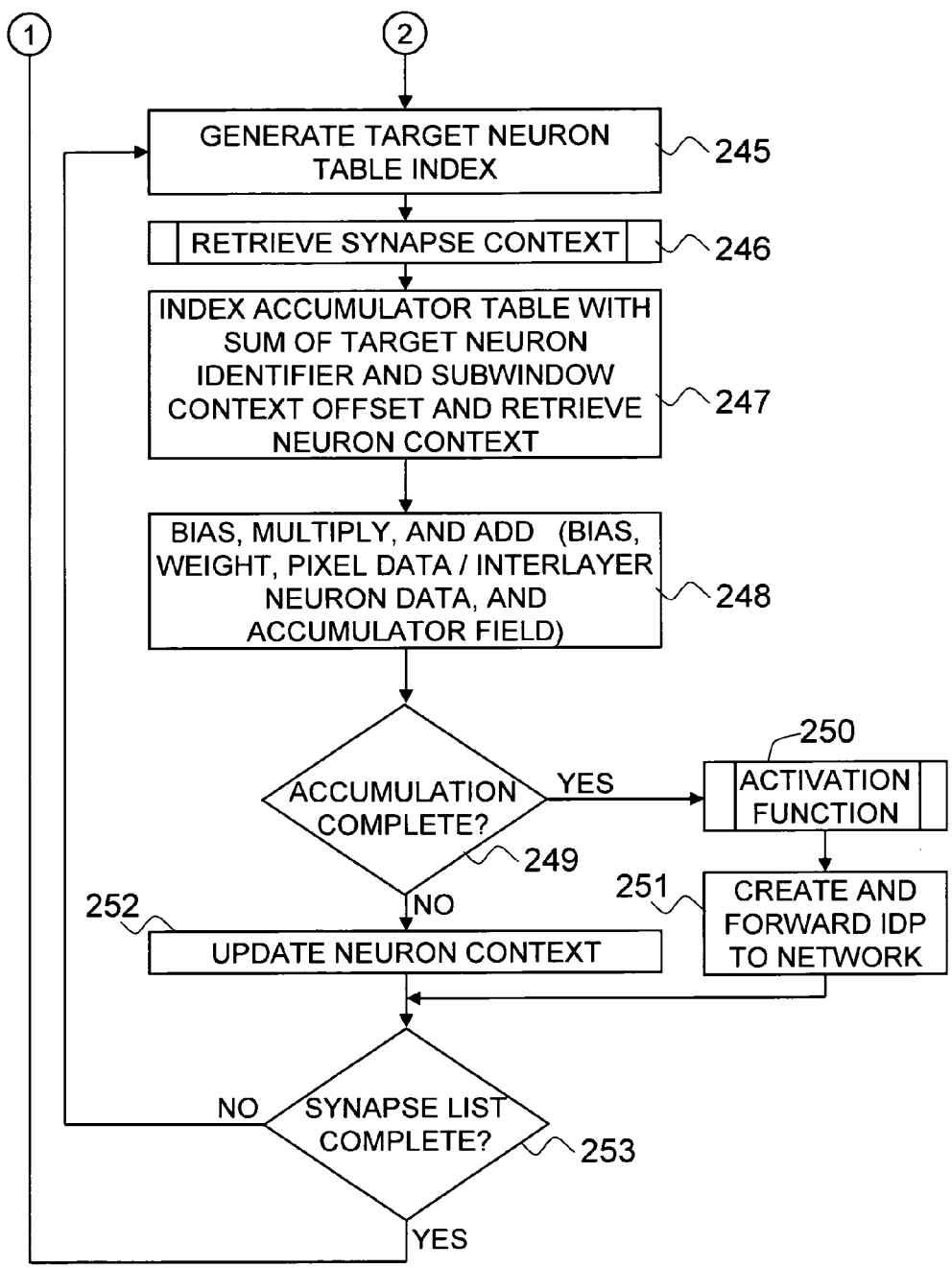
FIG. 14B shows an exemplary subwindow processor operation flowchart.

FIG. 14A and FIG. 14B show an exemplary subwindow processor operation flowchart.

In step 1 240, data arrives into the subwindow processor as either a PDP or an IDP, consisting of a pixel/interlayer neuron data 159 field, subwindow identifier SWID 152 field, source identifier 162 SID field, and valid flag 164. The process proceeds to step 2 241 if the valid flag is asserted. In step 2, the SID field is used to index the subwindow lookaside table 167. In step 3 242, the subwindow fault flag 168 is evaluated to determine if the subwindow context is currently located in the accumulator table. If the subwindow fault flag is asserted, the subwindow replacement process 243 illustrated in FIG. 11 is executed. Otherwise processing proceeds to step 4 244. In step 4 244, the template identifier 158 and the source identifier 162 are forwarded to the target neuron table index generator 166. In step 5 245, an index is calculated for the target neuron table. In step 6 246, the synapse context associated with the index calculated in step 5 is retrieved from the target neuron table. In step 7 247, adder 1 156 calculates the accumulator table address as the sum of the target neuron identifier 169 and the subwindow context offset 157. The accumulator table address accesses the accumulator table 176 to retrieve the active neuron context. In step 8 248, the pixel/interlayer neuron data 159 is added with the bias 154 of the active synapse context by adder 2 160. Multiplier 161 forms the product of the biased data and the weight 163 of the active synapse context. Adder 3 172 forms the sum of the output of multiplier 161 and the accumulation 170 of the active neuron context. In step 8 249, the accumulation remaining count 171 is evaluated to determine if the accumulations associated with the active neuron context are complete. If the accumulation is complete, denoted by the assertion of the accumulation done flag 177, processing continues at step 10 252. Otherwise processing continues at step 9 252.

If processing continues at step 9, the accumulation field of the active neuron context is updated with the result of step 8. In addition, the accumulation remaining count 171 is decremented by subtractor 173 and updated in the active neuron context.

If, however, processing branches from step 8 to step 10, the final accumulation computed in step 8 is forwarded to the activation unit 174. The activation unit 174 applies the activation function to the neuron data that is provided as input and returns an activated neuron data as output. In step 11 251, an interlayer neuron packet is created to forward the activated neuron data to its next recipient neuron. The source identifier field of the new IDP is obtained from the TNID 220. The subwindow identifier field of the new IDP is obtained from SWID 152. The data field of the new IDP is initialized with the result of the activation unit. The subwindow processor identifier 114 of the new IDP is initialized with SPID 175. The IDP is forwarded to the interconnection network. Because the subwindow processor identifier field of the new IDP is equal to the SPID 175 field of the incoming pixel/interlayer neuron packet, the IDP will be routed to the subwindow processor that generated the IDP. In step 12 253, the end-of-list flag 223 is evaluated to determine if all processing for the active IDP/PDP is complete. If the end-of-list flag is asserted in the active synapse context, then processing for the IDP/PDP is complete and processing restarts at step 1 240. If the end-of-list flag is not asserted, then there are more synapse contexts to be processed. In this case, processing restarts at step 5 245.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. An apparatus for object recognition from at least an image stream from at least an image frame utilizing at least an artificial neural network, comprising:
    a) means for generating multiple subwindows of an image of different scales and offsets simultaneously from a single image stream,
    b) at least a subwindow filter module that selects pixels belonging to a collection of subwindows that are assigned to the subwindow filter module for a predefined scale,
    wherein a collection of subwindow filter modules select pixels for a plurality of scales simultaneously,
    c) means for providing active pixel and interlayer neuron data to at least a subwindow processor,
    d) means for multiplying and accumulating the product of a pixel data or interlayer neuron data and a synapse weight,
    e) means for performing the activation of an accumulation, and
    f) means for mapping tasks to multiple instances of subwindow processors,
    wherein the artificial neural network is reconfigurable by programming at least a table,
    wherein the subwindow processor comprises means for performing neuron computations for at least a neuron, and
    wherein the number of instances of the subwindow processor is variable based on resource constraints of the object recognition.

2. The apparatus according to claim 1, wherein the apparatus further comprises means for supporting multiple artificial neural network configurations simultaneously,
    wherein each of the multiple artificial neural network configurations is mapped to a subwindow processor, and
    wherein a subwindow is declared as interesting or non-interesting as a result of information gained from an optional subwindow filtering process.

3. The apparatus according to claim 1, wherein the apparatus further comprises means for changing structure of the artificial neural network dynamically at run-time,
    wherein the structure comprises synapse connections of the artificial neural network, and
    wherein a subwindow logically encompasses neurons, synapse connections, and synapse weights, belonging to an instance of the artificial neural network.

4. The apparatus according to claim 1, wherein the apparatus further comprises means for reusing the neuron computation resources across different neurons of an artificial neural network to reduce resource utilization with respect to a direct implementation of the artificial neural network.

5. The apparatus according to claim 1, wherein the apparatus further comprises means for programming weight and threshold values to alter the computation performed by the artificial neural network.

6. The apparatus according to claim 1, wherein the apparatus further comprises means for augmenting available processing state memory with auxiliary memory to support a plurality of instances of an artificial neural network within a processing element.

7. The apparatus according to claim 1, wherein the apparatus further comprises means for providing application-specific region of interest information to reduce the number of subwindows and processing requirements.

8. The apparatus according to claim 1, wherein the apparatus further comprises means for maintaining computation state of at least a neuron comprising:
    a) accumulation value,
    b) the number of remaining accumulations, and
    c) a target neuron to which the accumulation result is forwarded.

9. The apparatus according to claim 1, wherein the apparatus further comprises means for emulating the artificial neural network to classify rectangular subwindows from the image frame,
    wherein a subwindow is the smallest 2D fixed sized array of pixels that can be processed by the artificial neural network, and
    wherein the artificial neural network is iteratively applied to each subwindow of interest.

10. The apparatus according to claim 1, wherein the apparatus further comprises means for maintaining column, row, and subwindow counts for the image subwindows to which the subwindow filter module is assigned.

11. The apparatus according to claim 1, wherein the apparatus further comprises means for identifying which of the assigned subwindows are of interest and should subsequently be forwarded to a subwindow processor.

12. The apparatus according to claim 1, wherein the apparatus further comprises means for mapping the assigned subwindows to the subwindow processor assigned to receive pixel data belonging to the subwindow.

13. The apparatus according to claim 1, wherein the apparatus further comprises at least a subwindow filter module that forms a pixel data packet for each non-discarded pixel,
 wherein the pixel data packet consists of a data field and a header field, and
 wherein the data field consists of the pixel, subwindow identification, and source identification, and
 the header field minimally consists of the subwindow processor identification which facilitates routing the packet to the proper subwindow processor via the interconnection network.

14. A method for object recognition from at least an image stream from at least an image frame utilizing at least an artificial neural network, comprising the steps of:
 a) generating multiple subwindows of an image of different scales and offsets simultaneously from a single image stream,
 b) utilizing at least a subwindow filter module that selects pixels belonging to a collection of subwindows that are assigned to the subwindow filter module for a predefined scale,
 wherein a collection of subwindow filter modules select pixels for a plurality of scales simultaneously,
 c) providing active pixel and interlayer neuron data to at least a subwindow processor,
 d) multiplying and accumulating the product of a pixel data or interlayer data and a synapse weight,
 e) performing the activation of an accumulation, and
 f) mapping tasks to multiple instances of subwindow processors,
 wherein the artificial neural networks is reconfigurable by programming at least a table,
 wherein the subwindow processor comprises means for performing neuron computations for at least a neuron, and
 wherein the number of instances of the subwindow processor is variable based on resource constraints of the object recognition.

15. The method according to claim 14, wherein the method further comprises a step of supporting multiple artificial neural network configurations simultaneously,
 wherein each of the multiple artificial neural network configurations is mapped to a subwindow processor, and
 wherein a subwindow is declared as interesting or non-interesting as a result of information gained from an optional subwindow filtering process.

16. The method according to claim 14, wherein the method further comprises a step of changing structure of the artificial neural network dynamically at run-time,
 wherein the structure comprises synapse connections of the artificial neural network, and
 wherein a subwindow logically encompasses neurons, synapse connections, and synapse weights, belonging to an instance of the artificial neural network.

17. The method according to claim 14, wherein the method further comprises a step of reusing the neuron computation resources across different neurons of an artificial neural network to reduce resource utilization with respect to a direct implementation of the artificial neural network.

18. The method according to claim 14, wherein the method further comprises a step of programming weight and threshold values to alter the computation performed by the artificial neural network.

19. The method according to claim 14, wherein the method further comprises a step of augmenting available processing state memory with auxiliary memory to support a plurality of instances of an artificial neural network within a processing element.

20. The method according to claim 14, wherein the method further comprises a step of providing application-specific region of interest information to reduce the number of subwindows and processing requirements.

21. The method according to claim 14, wherein the method further comprises a step of maintaining computation state of at least a neuron comprising:
 a) accumulation value,
 b) the number of remaining accumulations, and
 c) a target neuron to which the accumulation result is forwarded.

22. The method according to claim 14, wherein the method further comprises a step of emulating the artificial neural network to classify rectangular subwindows from the image frame,
 wherein a subwindow is the smallest 2D fixed sized array of pixels that can be processed by the artificial neural network, and
 wherein the artificial neural network is iteratively applied to each subwindow of interest from the image pyramid.

23. The method according to claim 14, wherein the method further comprises a step of maintaining column, row, and subwindow counts for the image subwindows to which the subwindow filter module is assigned.

24. The method according to claim 14, wherein the method further comprises a step of identifying which of the assigned subwindows are of interest and should subsequently be forwarded to a subwindow processor.

25. The method according to claim 14, wherein the method further comprises a step of mapping the assigned subwindows to the subwindow processor assigned to receive pixel data belonging to the subwindow.

26. The method according to claim 14, wherein the method further comprises a step of utilizing at least a subwindow filter module that forms a pixel data packet for each non-discarded pixel,
 wherein the pixel data packet consists of a data field and a header field, and
 wherein the data field consists of the pixel, subwindow identification, and source identification, and
 wherein the header field minimally consists of the subwindow processor identification which facilitates routing the packet to the proper subwindow processor via the interconnection network.

* * * * *